United States Patent [19]

Hayabuchi et al.

[11] Patent Number: 4,866,935
[45] Date of Patent: Sep. 19, 1989

[54] HYDRAULIC TORQUE CONVERTER

[75] Inventors: Masahiro Hayabuchi, Anjo; Kazumasa Tsukamoto, Toyota; Tokuyuki Takahashi, Aichi; Seitoku Kubo, Toyota; Koujiro Kuramochi, Okazaki, all of Japan

[73] Assignees: Aisin-Warner Kabushiki Kaisha, Anjo; Toyota Jidosha Kabushiki Kaisha, Toyota, both of Japan

[21] Appl. No.: 945,406

[22] Filed: Dec. 22, 1986

[30] Foreign Application Priority Data

Dec. 30, 1985 [JP] Japan .................. 60-297846

[51] Int. Cl.$^4$ ............................. F16D 33/20
[52] U.S. Cl. ......................... 60/361; 60/367
[58] Field of Search ................... 60/361, 367

[56] References Cited

U.S. PATENT DOCUMENTS

| | | | |
|---|---|---|---|
| 2,890,661 | 6/1959 | Egbert | 60/367 X |
| 3,828,554 | 8/1974 | Hau | 60/361 |
| 3,841,094 | 10/1974 | Cobb | 60/367 X |
| 4,009,570 | 3/1977 | Ohkuoo et al. | 60/367 X |
| 4,049,093 | 9/1977 | Vukovich et al. | 60/361 X |
| 4,159,628 | 7/1979 | Hiraiwa et al. | 60/364 |
| 4,186,557 | 2/1980 | Arai et al. | |

Primary Examiner—Gerald A. Michalsky
Attorney, Agent, or Firm—Kanesaka and Takeuchi

[57] ABSTRACT

In a hydraulic torque converter having a torus of flatness ratio (L/H) within the range 0.82–0.9, the outer and inner contours of the turbine in a meridional plane through the axis of the turbine each comprises a combination of a plurality of circular arcs, wherein the ratios between the radii of the circular arcs constituting said outer contour is substantially less than 2, and the ratios between the radii of the circular arcs constituting said inner contour is substantially less than 2.

As a result, fluid flows through the turbine stably without being biased, increasing the velocity of relative flow along the turbine blade, and raising the normal speed ratio at which the absolute flow is in the direction of no impact, enabling a higher stall torque ratio without reduction in efficiency.

4 Claims, 5 Drawing Sheets

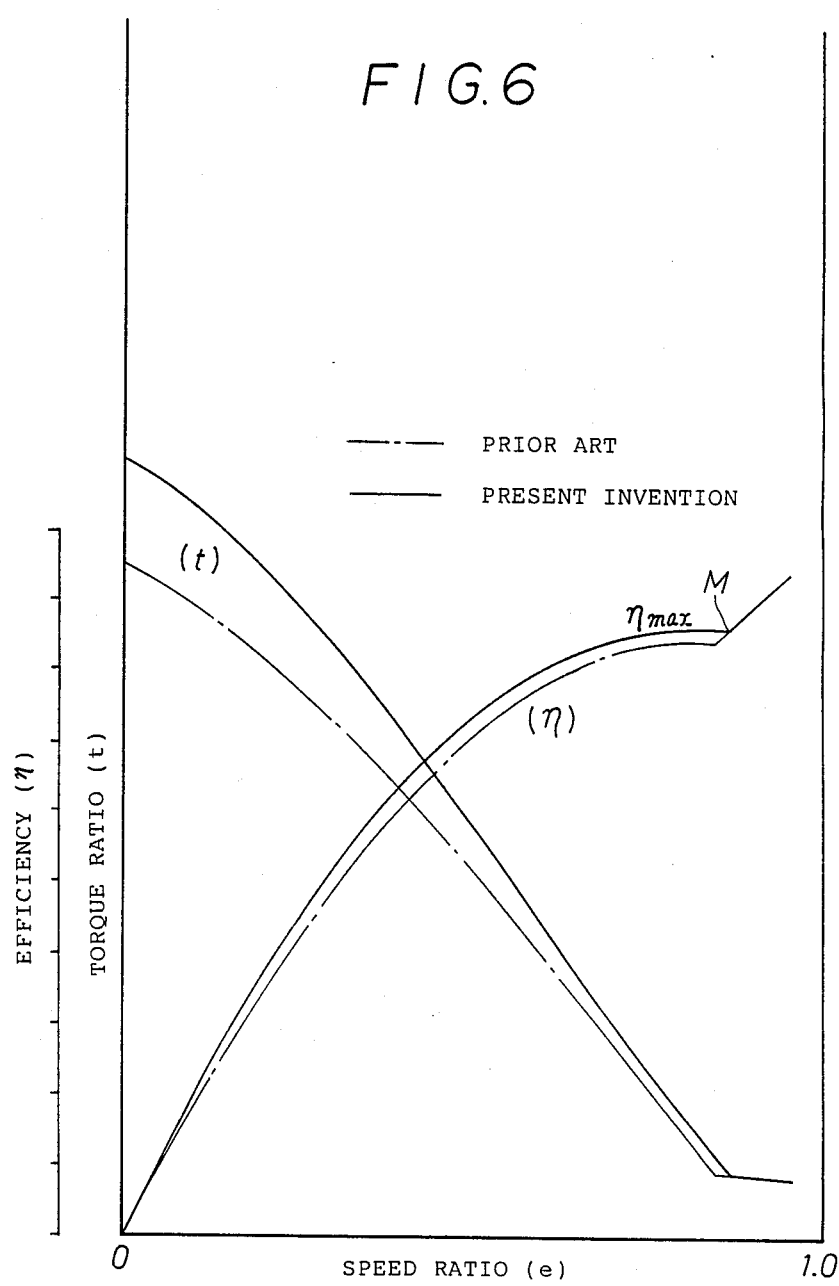

HYDRAULIC TORQUE CONVERTER

FIELD OF THE INVENTION

The present invention relates to a hydraulic torque converter, particularly to a hydraulic torque converter for use on motor vehicle, and which has a flattened torus compressed in axial direction, whose axial length is smaller than its radial height.

DESCRIPTION OF THE PRIOR ART

In recent years, restrictions on the space available for the mounting of torque converters on motor vehicles has tended to become more severe, due to the introduction of the front engine-front wheel drive arrangement and the tendency towards the adoption of larger capacity engines, and further, due to the incorporation of lock-up clutches. In order to meet such conditions, hydraulic torque converters having flattened toruses compressed in axial direction, whose axial length is smaller than their radial height, have been proposed. (Refer to U.S. Pat. Nos. 4,186,557 and 4,044,556)

As indicated in FIG. 2, such hydraulic torque converters of prior art having flattened toruses compressed in axial direction comprise an impeller 3 connected to the engine output drive plate 2, a turbine 6 connected to the input shaft 5 of the automatic transmission, and stator 9 supported by fixed member through a one-way clutch 7, wherein the impeller, turbine and stator form a torus 10' whose axial length L is smaller than its radial height H. For example, as indicated in U.S. Pat. No.4,186,557,the value of flatness ratio (L/H) is in the range 0.64–0.80, while the values of the ratio ($D_i/D_o$) of inner diameter $D_i$ of the torus to its outer diameter,or the maximum diameter of flow path $D_o$, and the ratio (s/S) of the annular flow passage area s at the impeller outlet to the circular area S defined by the maximum diameter of flow path $D_o$ of torus 10' are in the ranges 0.40–0.33and 0.18–0.23 respectively. The torus 10' has an outer shell 10'a and an inner core 10'b each formed by the outer and inner shrouds respectively of the impeller and turbine in a meridional plane through the axis of the torus, wherein the impeller and the turbine portions are formed in shapes substantially symmetrical to each other, the shell 10'a and the core 10'b each comprising a combination of plurality of circular arcs, in the meridional plane. In the above example, the shell 10'a comprises three circular arcs A', B' and C', the ratios between their radii being (B'/C')=3.341, (B'/A')=3.864 and (C'/A')=1.156', while the core 10'b comprises two circular arcs D' and E', the ratio between their radii being (E'/D')=3.071.

BACKGROUND OF THE INVENTION

In recent years, with the general improvement in motor vehicle performance accompanying increases in engine output among other factors, improvement has been sought in acceleration performance, particularly in the acceleration performance from standstill (hereafter referred to as starting performance), leading to the demand for a torque converter having a high (maximum) stall torque ratio.

In general practice, when designing a torque converter, the capacity factor is first determined considering its compatibility with the engine to be used, then the radial dimension of the torque converter, and the shapes of the impeller and turbine blades are determined on basis of the capacity factor. Meanwhile, the dimension of the torque converter, particularly the axial dimension, is determined from the restrictions imposed on its mounting on the vehicle. Hence, the flatness ratio L/H is determined from the radial dimension and the capacity factor.

Therefore in general, the profile of the stator blades has to be altered, increasing the difference between the inflow and outflow angles, in order to obtain a higher stall torque ratio.

As shown in FIG. 3, in a torque converter, a speed ratio at which the outflow from the turbine blade 6a is in the direction of no impact with the stator blade 9c is known as the normal speed ratio ($e_o$). At a speed ratio below the normal speed ratio, the outflow G from a turbine blade 6a impinges the concave face of a stator blade 9c, effecting the required torque conversion (torque conversion range), whereas at a higher speed ratio when the outflow M from the turbine blade 6a matches the outflow angle of the stator blade 9c, no torque is applied to the stator since no change occurs in the direction of flow (coupling point), and at an even higher speed ratio when the outflow H from the turbine blade 6a exceeds the direction of flow M at coupling point, the outflow impinges on the convex face of the stator blade 9c, causing the stator to rotate freely by overriding the one-way clutch 7 (coupling range).

If the camber of the stator blade 9c is increased from that indicated by broken lines to that indicated by solid lines in order to obtain a higher stall torque ratio, the outflow from the turbine blade 6a in the direction of no impact with the stator blade 9c, corresponding to the normal speed ratio ($e_o$), would shift from $0_1$ to $0_2$. This results in the shifting of the torque conversion range to a lower speed range, resulting in reduction in efficiency $\eta$, particularly in the maximum efficiency $\eta_{max}$. Hence in the torque converters of prior art described above, the stall torque ratio could not be raised if efficiency is to be maintained, and therefore has remained at relatively low values.

The object of the present invention is to provide a hydraulic torque converter which enables the selection of a high stall torque ratio without loss in efficiency, while maintaining the flatness ratio (L/H) within the range 0.82–0.9 to meet the mounting restrictions.

SUMMARY OF THE INVENTION

In the hydraulic torque converter of prior art described above, as the fluid circulates from the impeller 3 to the turbine 6 and then back to the impeller 3 through the stator 9, the mean streamline F through the torus 10' is influenced by the difference between the radii of adjacent pairs of circular arcs A' and B', and C', and D' and E', the circular arcs A', B', C', D' and E' constituting the shell 10'a and core 10'b, and is deflected sharply as shown in FIG.re 5, as the differences between these radii are large. Further, according to analysis made by the present inventor, the pressure distribution curve along the mean streamline was found to demonstrate roughness and instability at points near the inlet (1, 2, 3) and near the outlet (16, 17, 18), with a significant peak in the intermediate region. It is hence suspected that the pressure balance in the fluid is lost along the direction of radius of curvature near the inlet and outlet of impeller 3 and turbine 6, causing the flow of fluid to deviate toward the shell or the core, thus obstructing the smooth flow of fluid, and reducing the velocity of fluid flow at the outlets of impeller 3 and turbine 6.

Also, the absolute flow $f_1$, $f_2$ within the turbine 6 comprise the vector sums of relative flow $a_1$, $a_2$ along the blade 6a and flow r due to the rotation of blade 6a, as indicated in FIG. 4. Analysis shows that if the velocity of relative flow $a_1$ is reduced as stated above, the direction of absolute flow $f_1$ would point in the direction of no impact with the stator blade 9c when the velocity of rotational flow r is yet relatively slow.

The present invention was made based on the above analysis. Its basic concept is to obtain a higher stall torque ratio by increasing the flow velocity at the turbine outlet, while avoiding loss in efficiency by delaying the onset of normal speed ratio.

According to the present invention, in a hydraulic torque converter having a flattened torus compressed in axial direction with the ratios (L/H)=0.82–0.9 and (s/S)=0.18–0.23, the outer and inner contours of the torus in a meridional plane through the axis of the torus each comprises a combination of a plurality of circular arcs, where the ratios between the radii of circular arcs comprising said outer contour are substantially less than 2, and the ratios between the radii of circular arcs comprising said inner contour are substantially less than 2.

Referring to FIG. 1 which illustrates an example of the present invention, the present invention is characterized by the ratios (B/C) (B/A) and (C/A) of the radii of circular arcs A, B, and C forming the outer shell 10a of the torus 10 being substantially less than 2, and the ration (E/D) of the radii of circular arcs D and E forming the inner core 10b of the torus being substantially less than 2.

Under such configuration, the fluid flows stably without its streamline being biased along the entire length of the turbine blade when the fluid is circulated through the torus, since the fluid in the vicinity of the outer and inner walls flows smoothly along circular curves with small rate of change in curvature. This results in an increase in the velocity of relative flow ($a_2 > a_1$), so that at the same rotational velocity r, the direction of absolute flow $f_2$ is altered, increasing the angle of attack of the stator blade 9c, thus delaying the onset of normal speed ratio until a higher rotational velocity is reached.

BRIEF DESCRIPTION OF THE DRAWINGS

FIG. 1 is the cross sectional view of a hydraulic torque converter of the present invention, whereas

FIG. 3 shows the flow from turbine blade to stator blade, while

FIG. 6 is a graphical comparison of the performances of the hydraulic torque converters of prior art and present invention.

DETAILED DESCRIPTION OF THE PREFERRED EMBODIMENT

An embodiment of the present invention shall now be described with reference to the figures.

Figure 1:
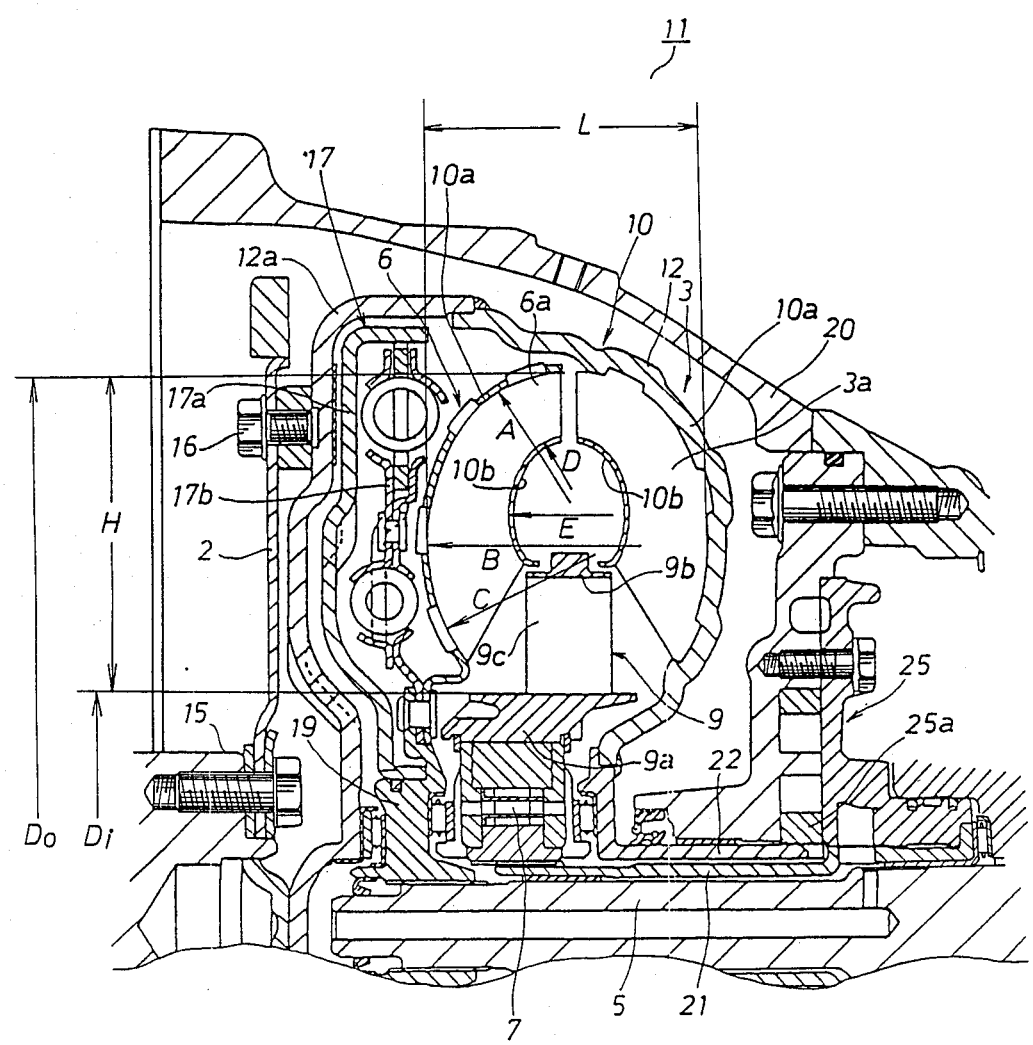

As shown in FIG. 1, the hydraulic torque converter comprises an impeller 3, a turbine 6 and stator 9 which together form a torus 10. The impeller 3 is formed integrally with a casing 12 comprising the outer shell 10a of the torus, and has blades 3a fixed between the shell 10a and inner core 10b. The turbine 6 comprises a shell 10a constituting the outer contour of the turbine, a core 10b constituting the inner contour of the turbine and blades 6a fixed in between the shell and the core. The stator is comprised of a hub 9a, an annular plate 9b and blades 9c fixed in between the hub and annular plate. A drive plate 2 connected to the engine crank shaft 15 is fixed by bolts 16 to a front cover 12a formed integrally with casing 12. Inside the front cover 12a is located a lock-up clutch 17. The lock-up clutch 17 comprises a clutch plate 17a which selectively engages with the inner face of the front cover 12a, and a damper 17b which absorbs the shock associated with the engaging of said clutch plate. The lock-up clutch 17 is fixed to the turbine hub 19 together with the turbine shell 10a, and the turbine hub 19 is connected through splines to the input shaft 5 of the automatic transmission comprising planetary gears. The stator hub 9a is supported through a one-way clutch 7 by a fixed sleeve 21 which is fitted around the shaft 5 and fixed to the housing 20, while an impeller sleeve 22 is rotatably supported around said fixed sleeve 21. One end of the impeller sleeve 22 is fixed to the casing 12 constituting the shell of impeller 3, while its other end is connected to the drive gear 25a of an oil pump 25.

The turbine and impeller portions of the tours 10 are substantially identical in shape, the torus being substantially symmetrical about its center line. Although explanation hereafter shall be made for the contour of the turbine portion only, it should be understood that the same apply to the impeller portion as well. The axial length L of the torus is smaller than its radial height H, giving the torus a flattened form. In detail, expressed in ratios to the maximum diameter of flow path $D_o$, the axial length L is approximately $0.25D_o$, and the radial height H is approximately $0.29D_o$, resulting in a flatness ratio (L/H) of approximately 0.87, while the ratio (s/S) of area s of the annular flow passage at the outlet from the impeller to the circular area S defined by the maximum diameter of flow path is 0.23, and the ratio ($D_i/D_o$) of inner diameter $D_i$ of the torus 10 to the maximum diameter of flow path $D_o$ is 0.42.

The outer contour of the turbine 10 and hence the shell 10a comprises three circular arcs A, B and C, where the ratios between their radii (B/C), (B/A) and (C/A) are all less than 2. In detail, the radii of circular arcs A, B and C are approximately $0.114D_o$, $0.197D_o$ and $0.138D_0$ respectively, where $D_o$ is the maximum diameter of flow path, resulting in ratios between their radii (B/C)=1.43, (B/A)=1.7 and (C/A)=1.21. The contour of the core 10b comprises two circular arcs D and E, where the ratio between their radii (E/D) is also less than 2. The radii of circular arcs D and E are $0.048D_o$ and $0.087D_o$ respectively, where $D_o$ is the maximum diameter of flow path, resulting in the ratio between their radii (E/D)=1.8.

In a hydraulic torque converter of the present embodiment described above, when the impeller 3 connected directly to the engine crank shaft 15 through the drive plate 2 and casing 12 is rotated, the fluid within the torus is driven toward the turbine 6 by centrifugal force, and circulates back to the impeller 3 from the turbine 6 through the stator 9. Under conditions of large difference in the ratational speeds between the impeller and turbine, the stator blades 9c deflect the flow of fluid in a manner so as to help in the rotation of the impeller, thus providing an increase in torque (torque convertion range). The torque ratio due to this increase in torque becomes larger as the difference in the rotational speeds between the impeller and the turbine becomes larger, and is maximum at stall, i.e. when the vehicle is at standstill and the turbine rotation is zero. As the difference in rotational speeds diminish, the torque ratio also diminishes, while the efficiency increases. As the turbine rotation is increased and outflow from the turbine 6 becomes faster, the normal speed ratio ($e_o$) is reached, whereafter the flow previously impinging on the concave face of the stator blade 9c impinges on the convex face of the stator blade, causing the stator 9 to rotate freely by overriding the one-way clutch 7 (coupling point). When the vehicle speed and throttle setting reach a predetermined condition, the locks-up clutch 17 engages the front cover 12a, whereafter the engine 2 and the automatic transmission 5 are mechanically connected without the fluid acting as a mediary.

Figure 5:
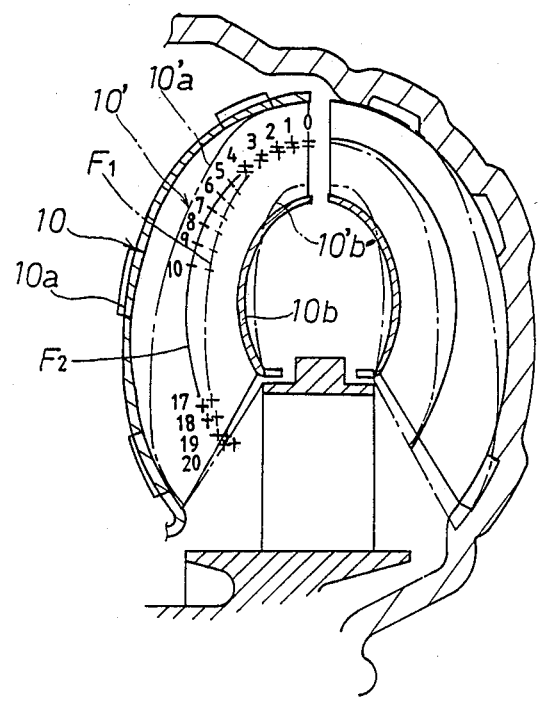
FIG. 5 shows the mean streamline within the toruses of prior art and present invention.

In the circulation of fluid within the torus, the flow along the outer shell 10a is generally stabilized, since for the circular arcs A, B and C constituting the shell 10a, the differences in the radii of adjacent pairs of circular arcs A and B, and B and C are small, and the difference in the radii of non-adjacent pair of circular arcs A and C is also small. Similarly, the flow along the inner core 10b also is stabilized, since the difference in the radii of circular arcs D and E constituting the core is small. As a result, the mean streamline becomes a smooth curve with gentle deflections as shown in FIG. 5, avoiding imbalance in fluid pressure along the direction of radius of curvature, hence causing the fluid to flow smoothly without bias along the direction of radius of curvature, and hence reducing loss due to this bias.

This phenomenon may be seen from the pressure distribution curve along the mean streamline, which shows smooth curves at points near the inlet (1, 2, 3,) and outlet (16, 17, 18), and a less significant peak in the intermediate region.

Figure 3:
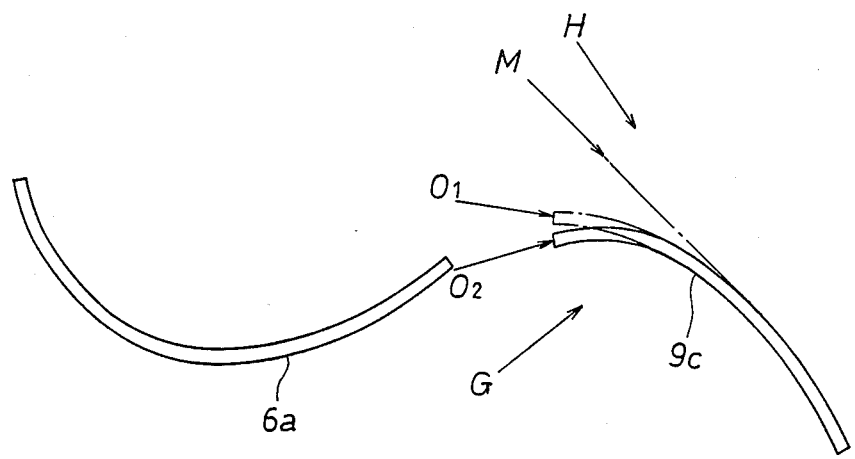
Figure 4:
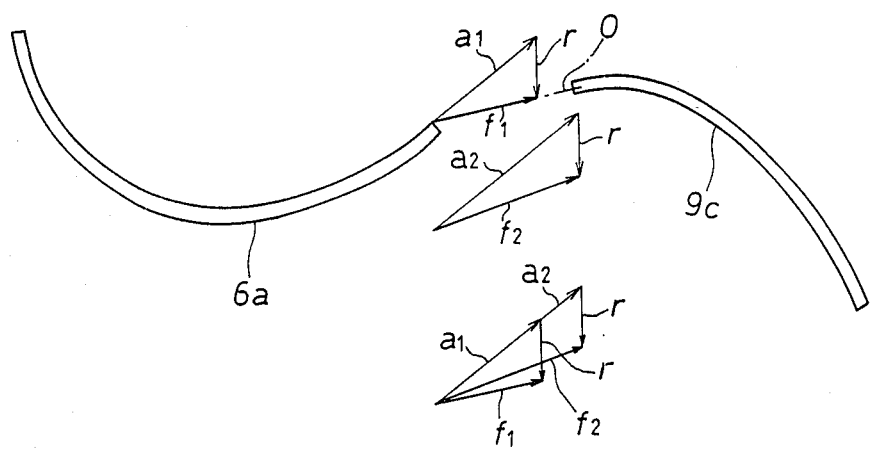
FIG. 4 is a vector diagram of the relative flow, the flow due to turbine rotation and the absolute flow between the turbine and stator blades.

Because the velocity of relative flow along the turbine blade 6a increases as shown in FIG. 4 due to the stabilization of flow, even when the camber of the stator blade 9c is increased to alter the direction of no impact for the absolute flow 0 from $0_1$ to $0_z$ (see FIG. 3), the rotational velocity r required to realize this flow in the direction of no impact is also increased, thus shifting the normal speed ratio to a larger value.

For toruses of flatness ratio (L/H) in the range 0.82–0.9, the stable flow described above in maintained if the ratios between the radii of cicular arcs constituting the outer and inner contours of the turbine (B/C), (B/A), (C/A) and (E/D) are substantially less than 2, and the velocity of relative flow along the turbine blade 6a is sufficient to raise the normal speed ratio. However, if the ratios of the radii are larger than 2, and the pressure distribution at points of deflection (where circular arcs of differing radii meet) is disturbed, and a sufficiently large change in the relative flow velocity to increase the normal speed ratio cannot be obtained.

Figure 2:
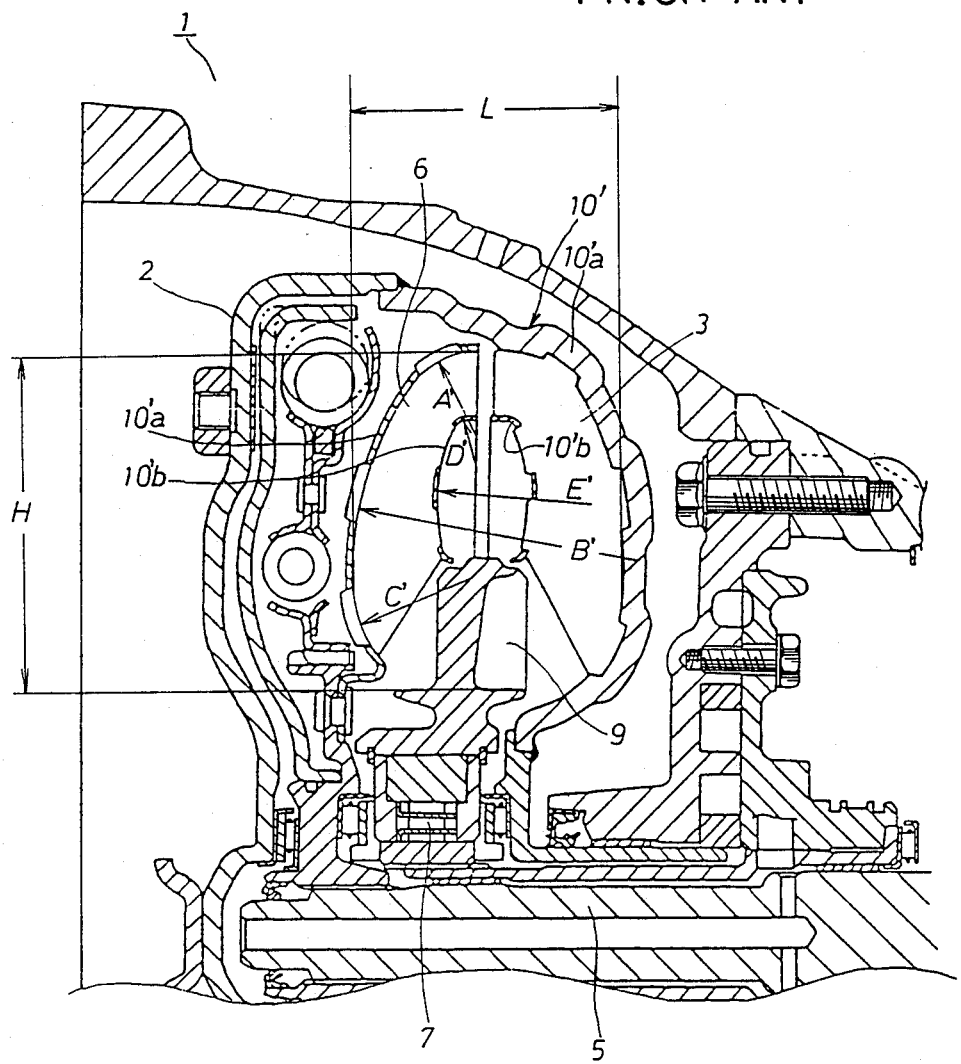
FIG. 2 is the cross sectional view of a hydraulic torque converter of prior art.

To demonstrate the above, the results of experiments comparing the performance of hydralic torque converters of prior art (FIG. 2) and the present invention (FIG. 1), both having the same maximum diameter of flow path is shown in FIG. 6.

FIG. 6 is a graphical comparison of torque ratio t and efficiency $\eta = t \cdot e$) plotted against speed ratio e (where e is the ratio of turbine speed $N_l$ to impeller $N_1$, $e = N_2/N_1$), for torque converters of prior art (dotted lines) and present invention (solid lines), where both torque converters have substantially identical capacity factors. As can be seen from this figure, for torque converters having substantially identical capacity factors, the stall torque ratio at zero speed ratio is larger for the present invention than for prior art, the efficiency $\eta$, particularly the maximum efficiency $\eta_{max}$, is higher over the entire torque conversion range for the present invention than for prior art, and the speed ratio at coupling point and hence also the normal speed ratio are higher for the present invention than for prior art.

Although in the embodiment described above the torus 10 comprised three circular arcs for the shell 10a and two for the core 10b, the number of circular arcs is not restrictive, but may be larger (or less) such as four for the shell and three for the core. Also, the torus need not be restricted to those comprising a combination of circular arcs only, but may also include those with other forms of curve, such as ellypse, cycloid or spiral, connecting two circular arcs.

Although explanations have been made on a torus of symmetrical shape, it should be understood that as long as the ratios of the radii of circular arcs constituting the contour of the torus on the turbine portion are substantially less than 2, the torus may also be of unsymmetrical shape, and that the impeller portion need not satisfy the same condition.

As has been explained, according to the present invention, the total efficiency of torque converter having a flattened torus compressed in axial direction whose axial length is smaller that its radial height can be improved, by maintaining the balance in fluid pressure along the direction of radius of curvature to avoid the flow being biased, and reducing the loss due to this bias of flow, because the ratios of the radii of circular arcs A, B, C, D and E constituting the outer and inner contour of the turbine are small, i.e. substantially less than 2.

Also, by removing the disturbances in flow through the turbine, particularly at its inlet and outlet, the velocity of relative flow along the turbine blade is increased, which in turn increases the turbine speed at normal speed ratio, and improves the maximum efficiency by raising the normal speed ratio. The required efficiency can thus be maintained while the profile of the stator blade is altered to obtain a high stall torque ratio in order to improve the starting performance of a motor vehicle, hence enabling the torque converter to meet the demands imposed by higher performance motor vehicles of recent years.

What is claimed is:

1. A hydraulic torque converter comprising an impeller, , turbine, blades and stator having a flattened torus compressed in an axial direction, the ration (L/H) between axial length (L) and radial height (H) of the torus being substantially less than 0.9, said impeller and turbine in a meridional plane through the axis of the torus having outer and inner contours formed of a combination of a plurality of circular arcs, ratios between the radii of the circular arcs constituting said outer contour being substantially in the range of 1.21–2.0 and ratios between the radii of the circular arcs constituting said inner contour being substantially less than 2, said outer and inner contours being connected together by means of the blades.

2. A hydraulic torque converter according to claim 1, wherein the ratio (L/H) of the torus is substantially within the range 0.82–0.9.

3. A hydraulic torque converter comprising:
a casing adapted to be connected to an engine drive shaft, said casing including a first outer shell having a contour formed of a plurality of circular arcs with different radii, each ratio between the radii of the arcs for a small one to a large one being substantially in the range of 1.21–2.0, a plurality of impeller blades connected to the first outer shell to extend inwardly therefrom and having inner ends, and a first inner core connected to the inner ends of the impeller blades, said inner core having contour formed of at least two circular arcs, ratio between radii of the circular arcs from a small one to a larger one being less than 2, a stator situated inside the casing adjacent the impeller blades, a turbine adapted to be connected to an output shaft of the torque converter, said turbine including a second outer shell having a contour substantially symmetrical to the first outer shell, said second outer shell being situated adjacent to the first outer shell to be arranged symmetrically therewith, a plurality of blades connected to the second outer shell to extend inwardly therefrom and having inner ends, and a second inner core connected to the inner ends of the turbine blades, said second inner core having a contour substantially symmetrical to the first inner core and being arranged symmetrically relative to the first inner core, and a torus defined between the first and second outer shells and having a ratio (L/H) of substantially less than 0.9 between axial length (L) and radial height (H), so that torque is effectively transferred from the casing to the turbine.

4. A hydraulic torque converter according to claim 3, wherein a ratio (s/S) of area s of the annular flow passage at an outlet from the impeller to a circular area S defined by a maximum diameter of the flow path is between 0.18 and 0.23.

* * * * *